US011385930B2

(12) United States Patent
Frost

(10) Patent No.: US 11,385,930 B2
(45) Date of Patent: Jul. 12, 2022

(54) AUTOMATIC WORKFLOW-BASED DEVICE SWITCHING

(71) Applicant: Citrix Systems, Inc., Fort Lauderdale, FL (US)

(72) Inventor: Simon Frost, Hitchin (GB)

(73) Assignee: Citrix Systems, Inc., Fort Lauderdale, FL (US)

(*) Notice: Subject to any disclaimer, the term of this patent is extended or adjusted under 35 U.S.C. 154(b) by 0 days.

(21) Appl. No.: 15/629,118

(22) Filed: Jun. 21, 2017

(65) Prior Publication Data

US 2018/0373568 A1 Dec. 27, 2018

(51) Int. Cl.
*G06F 9/48* (2006.01)
*G06F 9/50* (2006.01)
(Continued)

(52) U.S. Cl.
CPC ............ *G06F 9/4881* (2013.01); *G06F 9/455* (2013.01); *G06F 9/45533* (2013.01); *G06F 9/45558* (2013.01); *G06F 9/48* (2013.01); *G06F 9/485* (2013.01); *G06F 9/4806* (2013.01); *G06F 9/4843* (2013.01); *G06F 9/4856* (2013.01);
(Continued)

(58) Field of Classification Search
CPC ..... H04L 67/025; H04L 67/125; G06F 9/455; G06F 9/45533; G06F 9/45558; G06F 2009/45575; G06F 9/48; G06F 9/4806; G06F 9/4843; G06F 9/485; G06F 9/4881; G06F 9/50; G06F 9/5005; G06F 9/5011; G06F 9/5016; G06F 9/5022; G06F 9/5027; G06F 9/5044; G06F 9/5055; G06F 9/5061; G06F 9/5077; G06F 9/5083; G06F 9/54; G06F 9/547
See application file for complete search history.

(56) References Cited

U.S. PATENT DOCUMENTS 8,495,193 B2 * 7/2013 Kuzhiyil ............... G06F 9/5038
709/223
8,745,205 B2 * 6/2014 Anderson ............. H04L 9/3213
709/224
(Continued)

FOREIGN PATENT DOCUMENTS

EP 1760584 A1 3/2007
WO 2016/015519 A1 2/2016

OTHER PUBLICATIONS

Aug. 2, 20189 (WO) International Search Report and Written Opinion—App PCT/US2018/032705.
(Continued)

*Primary Examiner* — Charles M Swift
(74) *Attorney, Agent, or Firm* — Banner & Witcoff, Ltd.

(57) ABSTRACT

Methods and systems for receiving an indication that an application running on a first device is ready to perform a task, determining a device capability associated with performing the task, determining one or more devices associated with a user of the first device, wherein each of the one or more devices is associated with the device capability, selecting, based on the task and one or more user preferences associated with the user, a second device from the one or more devices, and sending an instruction to the second device, wherein the instruction causes the second device to perform the task, are described herein.

20 Claims, 12 Drawing Sheets

(51) Int. Cl.
*G06F 9/455* (2018.01)
*H04L 67/025* (2022.01)
*H04L 67/125* (2022.01)
*G06F 9/54* (2006.01)

(52) U.S. Cl.
CPC .............. *G06F 9/50* (2013.01); *G06F 9/5005* (2013.01); *G06F 9/5011* (2013.01); *G06F 9/5016* (2013.01); *G06F 9/5022* (2013.01); *G06F 9/5027* (2013.01); *G06F 9/5044* (2013.01); *G06F 9/5055* (2013.01); *G06F 9/5061* (2013.01); *G06F 9/5077* (2013.01); *G06F 9/5083* (2013.01); *G06F 9/54* (2013.01); *G06F 9/547* (2013.01); *H04L 67/025* (2013.01); *H04L 67/125* (2013.01); *G06F 2009/45575* (2013.01); *G06F 2209/509* (2013.01)

(56) References Cited

U.S. PATENT DOCUMENTS

| | | | | |
|---|---|---|---|---|
| 2004/0154027 A1* | 8/2004 | Vandewalle | ............ | G06F 9/548 719/330 |
| 2005/0021712 A1* | 1/2005 | Chassapis | ............. | G08C 17/00 709/223 |
| 2007/0078991 A1* | 4/2007 | Kim | ........................ | G06Q 10/10 709/228 |
| 2011/0276961 A1* | 11/2011 | Johansson | ................. | G06F 8/61 717/178 |
| 2012/0066607 A1* | 3/2012 | Song | ..................... | G06F 9/5077 715/737 |
| 2012/0209923 A1* | 8/2012 | Mathur | ................... | G06F 21/53 709/206 |
| 2012/0254966 A1 | 10/2012 | Parker | | |
| 2013/0061120 A1* | 3/2013 | Zeine | ................... | G06F 16/954 715/207 |
| 2013/0159376 A1* | 6/2013 | Moore | ................... | H04L 67/10 709/202 |
| 2014/0032691 A1* | 1/2014 | Barton | ................... | H04L 41/00 709/206 |
| 2014/0143785 A1* | 5/2014 | Mistry | ................... | G06F 1/329 718/104 |
| 2014/0344446 A1 | 11/2014 | Rjeili et al. | | |
| 2014/0359637 A1 | 12/2014 | Yan | | |
| 2015/0358392 A1* | 12/2015 | Ramalingam | ......... | G06F 16/972 709/203 |
| 2015/0370603 A1* | 12/2015 | Fuller | ................... | G06F 9/5011 718/104 |
| 2015/0378766 A1* | 12/2015 | Beveridge | ........... | G06F 9/45558 718/1 |
| 2015/0378771 A1* | 12/2015 | Tarasuk-Levin | .... | G06F 9/45558 718/1 |
| 2016/0080475 A1 | 3/2016 | Singh et al. | | |
| 2016/0085439 A1* | 3/2016 | Threlkeld | ............. | G06F 3/0486 715/740 |
| 2016/0127465 A1* | 5/2016 | Barstow | .................. | G06F 16/27 707/620 |
| 2016/0164696 A1 | 6/2016 | Yuan et al. | | |
| 2016/0173648 A1* | 6/2016 | De Angelis | ............. | H04L 67/10 709/203 |
| 2016/0188371 A1* | 6/2016 | Munshi | ................. | G06F 9/4843 718/104 |
| 2016/0224364 A1* | 8/2016 | Herrendoerfer | ...... | H04L 67/143 |
| 2016/0292178 A1* | 10/2016 | Manville | ............. | G06F 16/1752 |
| 2016/0353245 A1* | 12/2016 | Kulikov | .................. | G06Q 30/02 |
| 2016/0378546 A1* | 12/2016 | Brouwer | ............. | G06F 9/45558 718/1 |
| 2016/0378570 A1* | 12/2016 | Ljubuncic | ............. | G06F 9/5027 718/104 |
| 2017/0032143 A1 | 2/2017 | Kong et al. | | |
| 2017/0185441 A1* | 6/2017 | Hay | ....................... | G06F 21/566 |
| 2018/0189087 A1* | 7/2018 | Palermo | .............. | G06F 9/45558 |

OTHER PUBLICATIONS

Scott, Cam, "Cross-device experiences with Project Rome—Building Apps for WindowsBuilding Apps for Windows", Oct. 11, 2016, downloaded on Aug. 10, 2017 from https://blogs.windows.com/buildingapps/2016/10/11/cross-device-experience-with-project-rome/[Aug. 10, 2017 9:33:34 AM].
"Use Continuity to connect your Mac, iPhone, iPad, iPod touch, and Apple Watch", downloaded Aug. 10, 2017 from https://support.apple.com/en-us/HT204681[Aug. 10, 2017 10:19:24 AM].
"Use AirPlay or AirPlay Mirroring on you iPhone, iPad, or iPod touch", downloaded Aug. 10, 2017 from https://support.apple.com/en-us/HT204289[Aug. 10, 2017 10:21:48 AM].
Farrugia, Simon, "Have you heard about Crystal Palace on the grapevine?", Oct. 8, 2013, downloaded Aug. 10, 2017 from https://www.citrix.com/blogs/2013/10/08/have-you-heard-about-crystal-palace-on-the-grapevine/[Aug. 10, 2017 10:15:26 AM].
"Sessions", Jan. 7, 2016, downloaded on Aug. 10, 2017 from https://docs.citrix.com/en-us/xenapp-and-xendesktop/7-7/manage-deployment/sessions.html.

* cited by examiner

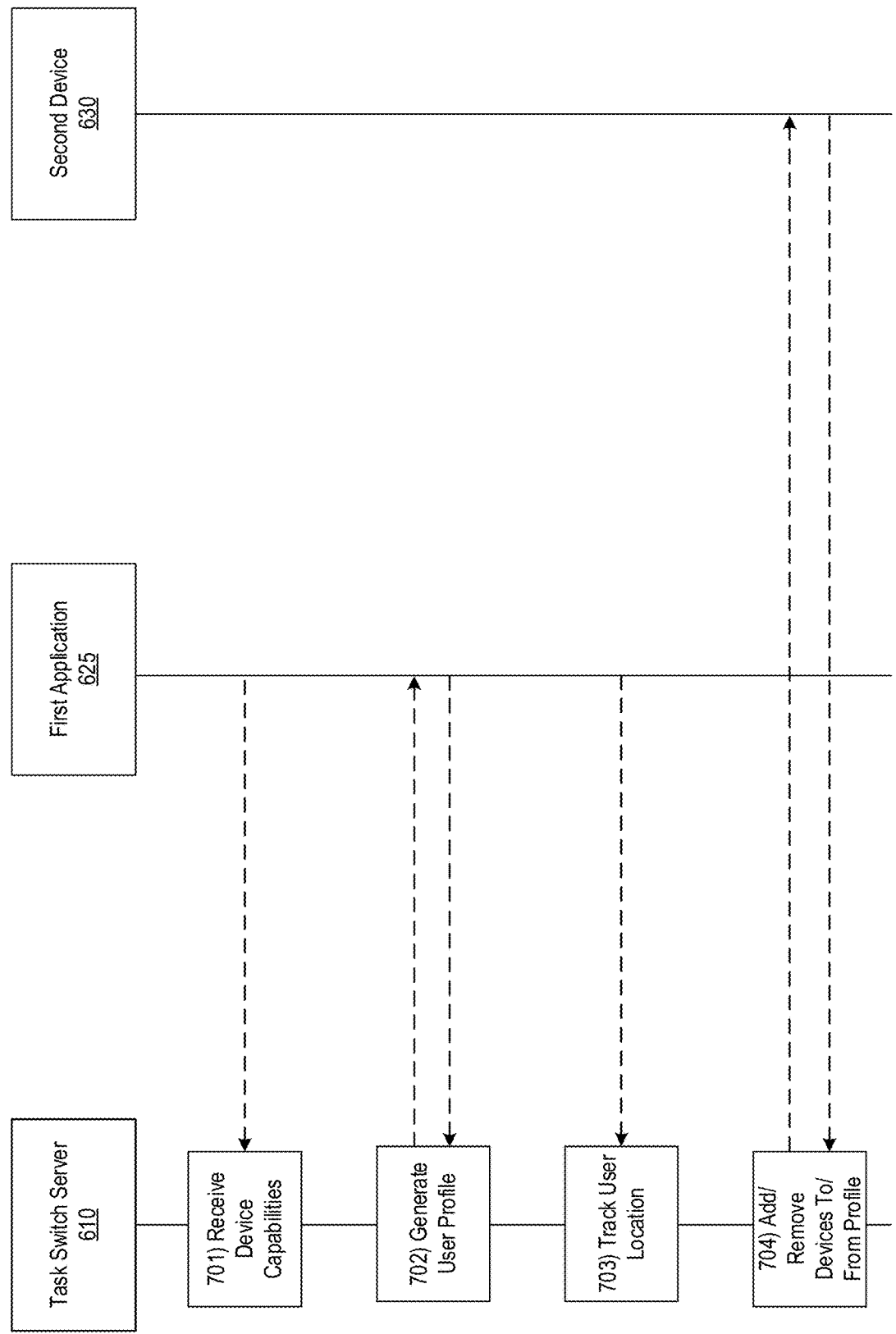

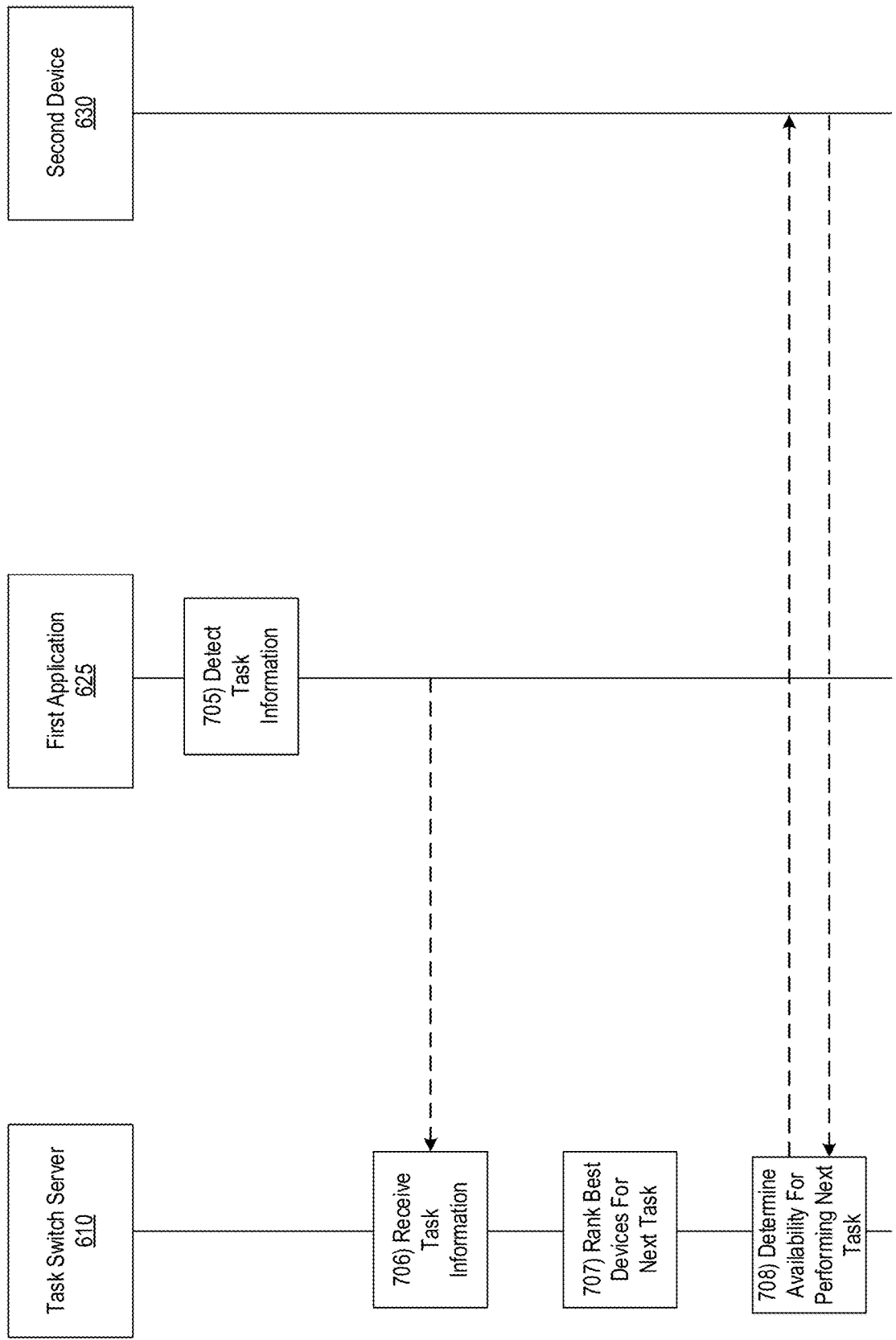

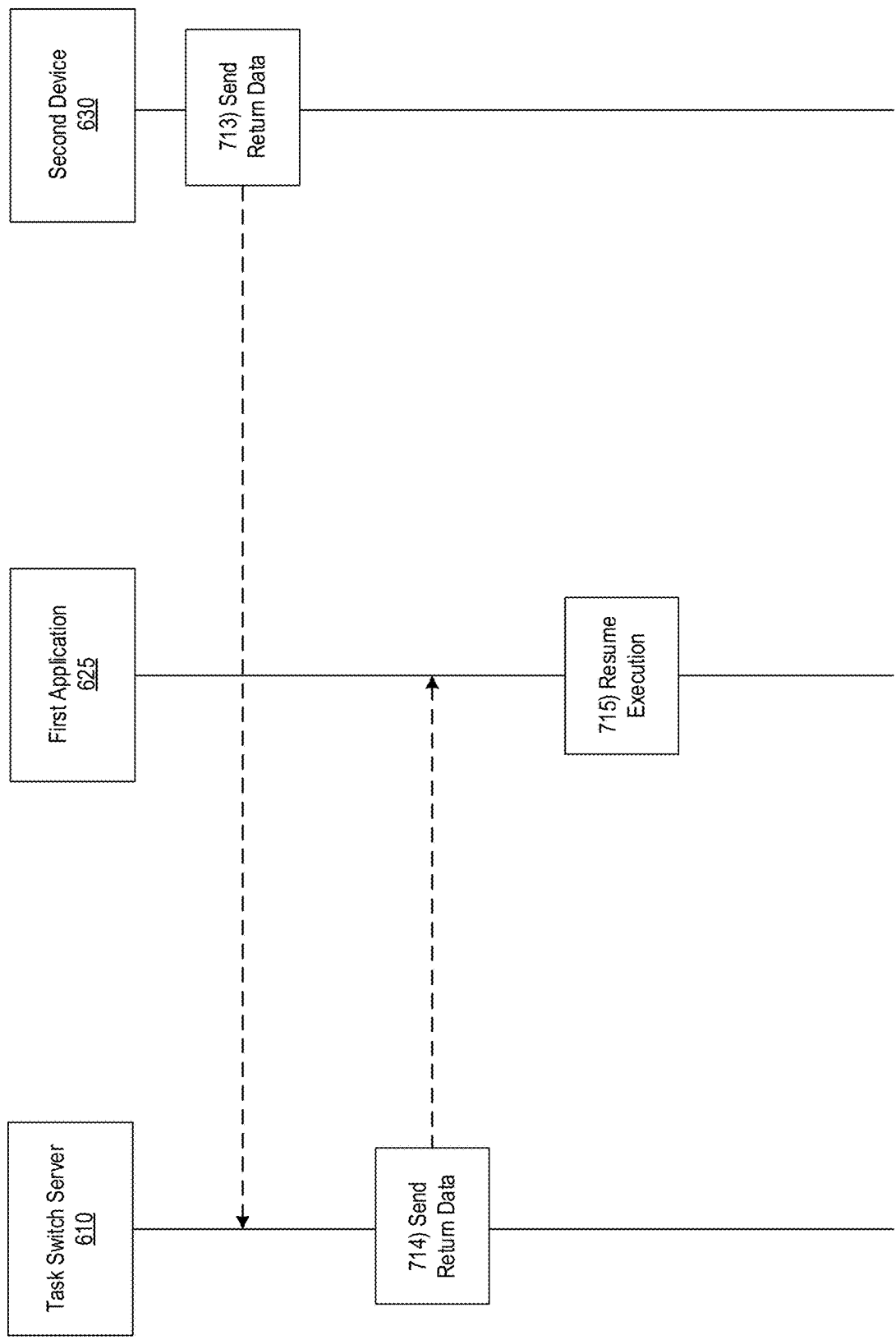

AUTOMATIC WORKFLOW-BASED DEVICE SWITCHING

FIELD

Aspects described herein generally relate to multiple computing devices interacting together to perform one or more tasks.

BACKGROUND

Users commonly own or have access to a multitude of devices such as smart phones, tablets, computers, televisions, and other electronic devices. Users commonly interact with and consume media and other content via the multitude of devices. Some devices are more capable of interacting with and/or consuming certain types of media and other content than other devices.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards systems and methods for automatically selecting devices to perform different tasks of user workflows.

One or more systems as described herein may execute a method that includes receiving an indication that an application running on a first device is ready to perform a task, determining a device capability associated with performing the task, determining one or more devices associated with a user of the first device, wherein each of the one or more devices is associated with the device capability, selecting, based on the task and one or more user preferences associated with the user, a second device from the one or more devices, and sending an instruction to the second device, wherein the instruction causes the second device to perform the task.

The method executed by the one or more systems as described herein may further include a method wherein the device capability is one or more of a display size, a type of input device, a type of output device, and a type of network connection.

The method executed by the one or more systems as described herein may further include receiving, from the second device, one or more device capabilities associated with the second device, and adding the second device and the one or more device capabilities to a profile associated with the user.

The method executed by the one or more systems as described herein may further include before receiving the one or more device capabilities from the second device, and responsive to determining that the user is nearby the second device, transmitting, to the second device, a request for the one or more capabilities associated with the second device.

The method executed by the one or more systems as described herein may further include receiving data generated by performing the task on the second device, and transmitting the data to the first device.

The method executed by the one or more systems as described herein may further include transmitting an instruction, to the first device, that causes the first device to display the data.

The method executed by the one or more systems as described herein may further include sending an instruction, to the first device, that causes the first device to pause an execution of the application running on the first device while the second device performs the task, and responsive to the second device completing the task, sending an instruction that causes the first device to resume the execution of the application running on the first device.

The method executed by the one or more systems as described herein may further include a method wherein the instruction further causes the first device to, during the pausing, display a message indicating that the second device is performing the task.

The method executed by the one or more systems as described herein may further include a method wherein the indication that the application running on the first device is ready to perform a task comprises an indication that the application attempted to access a virtual device associated with the device capability.

The method executed by the one or more systems as described herein may further include a method wherein the application running on the first device is a web browser, and the indication that the application running on the first device is ready to perform a task comprises an indication that the web browser received a selection of a link.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein:

FIGS. 7A, 7B, 7C, and 7D depict an illustrative process flow that may be used in accordance with one or more illustrative aspects described herein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards performing different tasks of a user workflow at different devices associated with the user. A task switch server and/or a user device may automatically monitor a user's context to determine a current and/or next task in a user workflow. The task switch server may further monitor which devices are available to the user, and rank each device's capability for performing a particular current and/or next task. In this way, the task switch server may be able to automatically identify an opportunity to perform a task at a more appropriate device, notify a user of the opportunity, and coordinate the performance of the tasks across the different devices.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
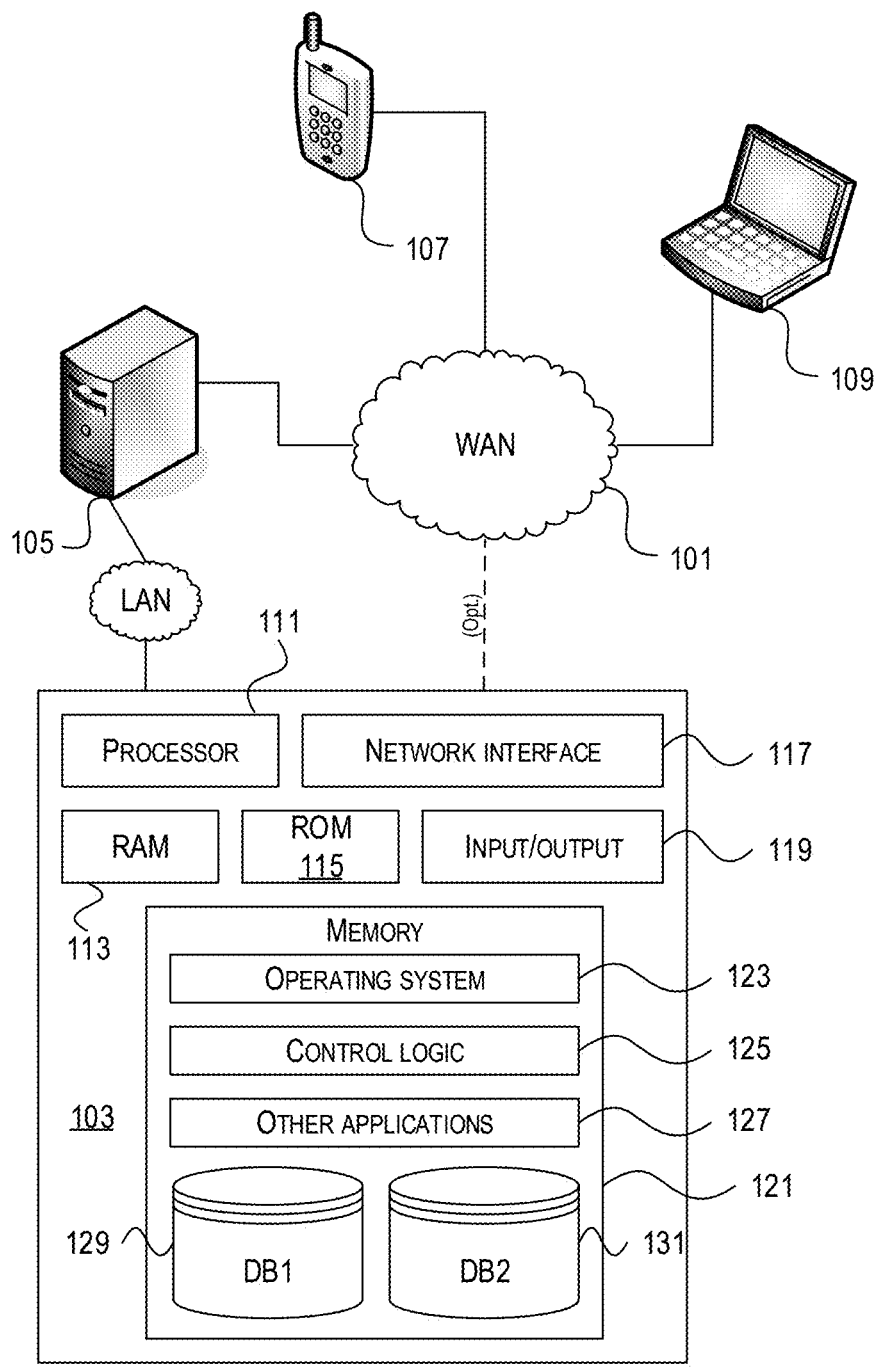
FIG. 1 depicts an illustrative computer system architecture that may be used in accordance with one or more illustrative aspects described herein.

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects described herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
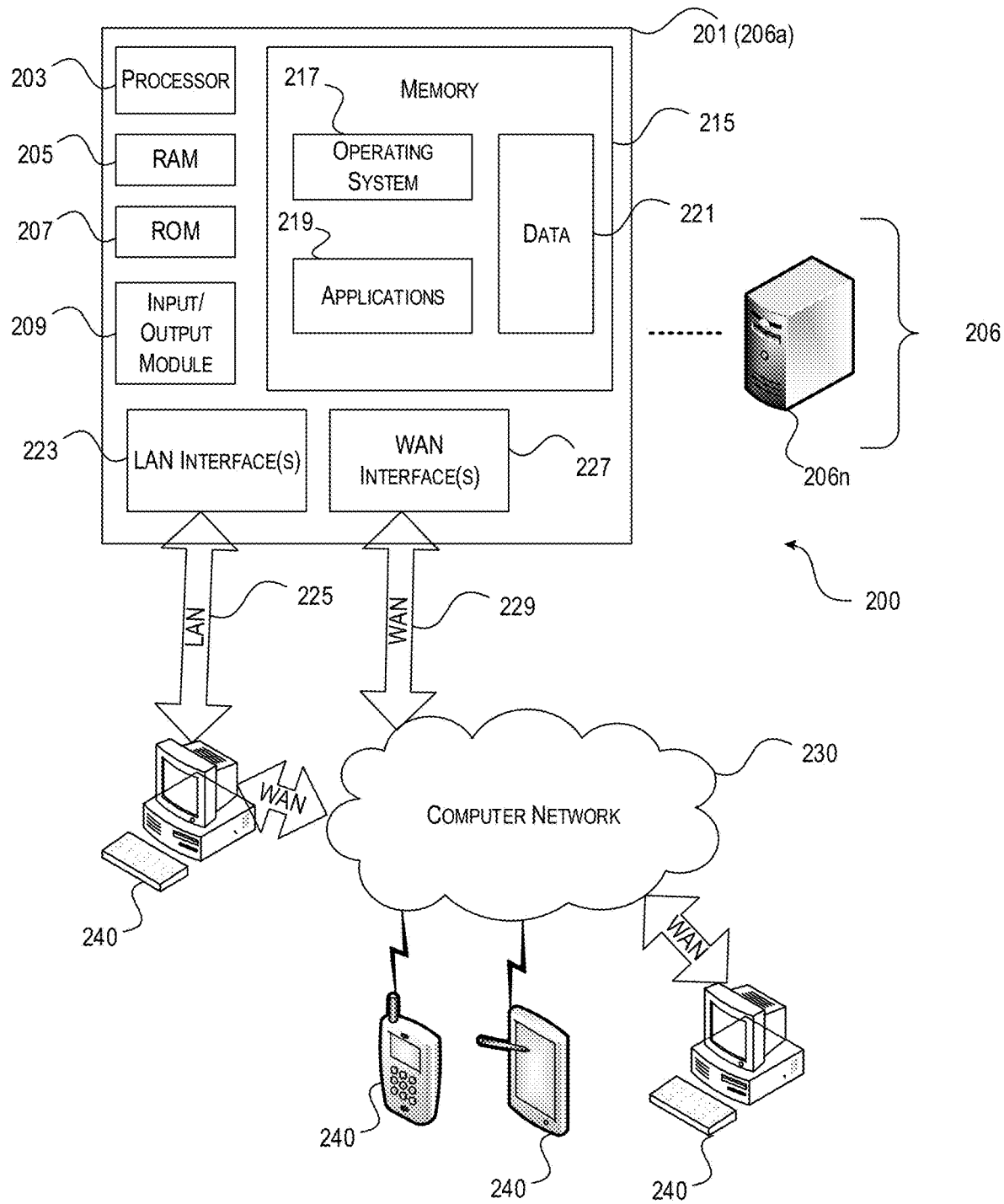
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a generic computing device 201 in an illustrative computing environment 200 that may be used according to one or more illustrative aspects described herein. Generic computing device 201 may be used as a server 206*a* in a single-server or multi-server desktop virtualization system (e.g., a remote access or cloud system) configured to provide virtual machines for client access devices. The generic computing device 201 may have a processor 203 for controlling overall operation of the server and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of generic computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring generic computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the generic computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206*a*-206*n* (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown.) First server 206a may acquire an enumeration of applications available to the client machine 240 and well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Figure 3:
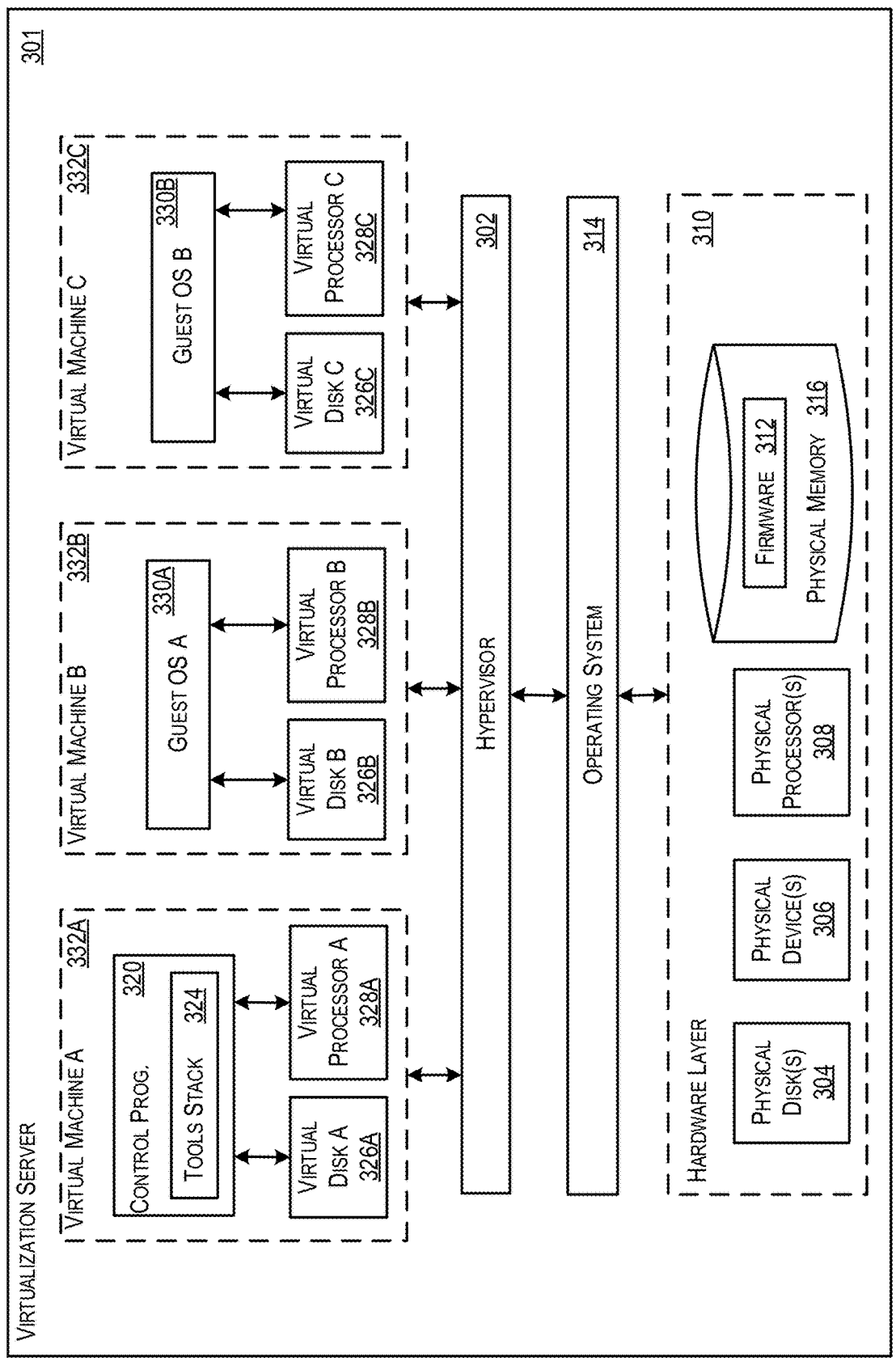
FIG. 3 depicts an illustrative virtualized (hypervisor) system architecture that may be used in accordance with one or more illustrative aspects described herein.

FIG. 3 shows a high-level architecture of an illustrative application virtualization system. As shown, the application virtualization system may be single-server or multi-server system, or cloud system, including at least one virtualization server 301 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

A computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308, and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more physical memory 316. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor executes within an operating system 314 executing on the virtualization server 301. Virtual machines may then execute at a level above the hypervisor. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316, and any other component included in virtualization server 301 hardware layer 310. Hypervisor 302 may be used to emulate virtual hardware, partition physical hardware, virtualize physical hardware, and/or execute virtual machines that provide access to computing environments. In still other embodiments, hypervisor 302 may control processor scheduling and memory partitioning for a virtual machine 332 executing on virtualization server 301. Hypervisor 302 may include those manufactured by VMWare, Inc., of Palo Alto, Calif.; the XENPROJECT hypervisor, an open source product whose development is overseen by the open source XenProject.org community; HyperV, VirtualServer or virtual PC hypervisors provided by Microsoft, or others. In some embodiments, virtualization server 301 may execute a hypervisor 302 that creates a virtual machine platform on which guest operating systems may execute. In these embodiments, the virtualization server 301 may be referred to as a host server. An example of such a virtualization server is the XENSERVER provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may execute a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may present at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, may imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, may provide each virtual machine 332 with a unique virtual view of the physical hardware, memory, processor, and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor, and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided, and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided, and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
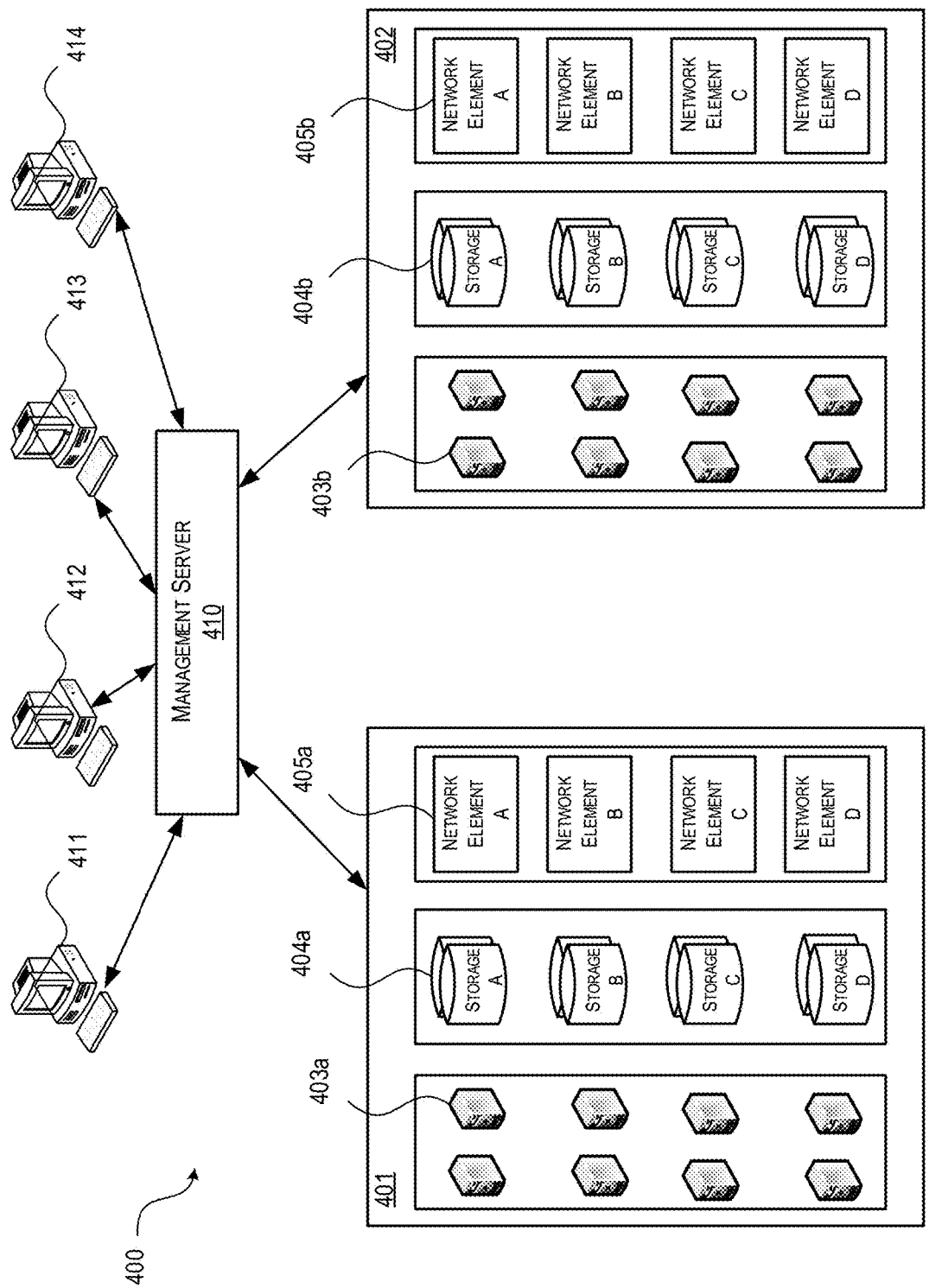
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403a-403b (generally referred herein as "host servers 403"), storage resources 404a-404b (generally referred herein as "storage resources 404"), and network resources 405a-405b (generally referred herein as "network resources 405")) of the cloud system.

Management server 410 may be implemented on one or more physical servers. The management server 410 may run, for example, CLOUDPLATFORM by Citrix Systems, Inc. of Ft. Lauderdale, Fla., or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system 400. For example, the management server 410 may provide a set of application programming interfaces (APIs) and/or one or more cloud operator console applications (e.g., web-based or standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or some other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management server 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Workflow-Based Device Switching

A user may be associated with a network of devices, including private devices owned or otherwise personally associated with the user, as well as shared or otherwise public devices. Users commonly perform workflows comprising a series of tasks, one after the other, on a single device. However, some of the workflow tasks may be more appropriate for performance at some of the devices than others. For example, a user may wish to view a document at a first device having a large screen, then sign the document on another device having a touchpad and/or stylus. As another example, a user may wish to browse a series of images captured on a first device, then view one or more of the images on another device having a larger display. In another example, a user may wish to browse information about a business or other establishment on a first device, then call the business or establishment on a second device having a telephone function. As another example, a user may wish to access private information on a first device after authenticating the user's identity on a second device having a fingerprint reader. Accordingly, users may wish to switch a workflow from one device to another device at certain events of a workflow.

Figure 5:
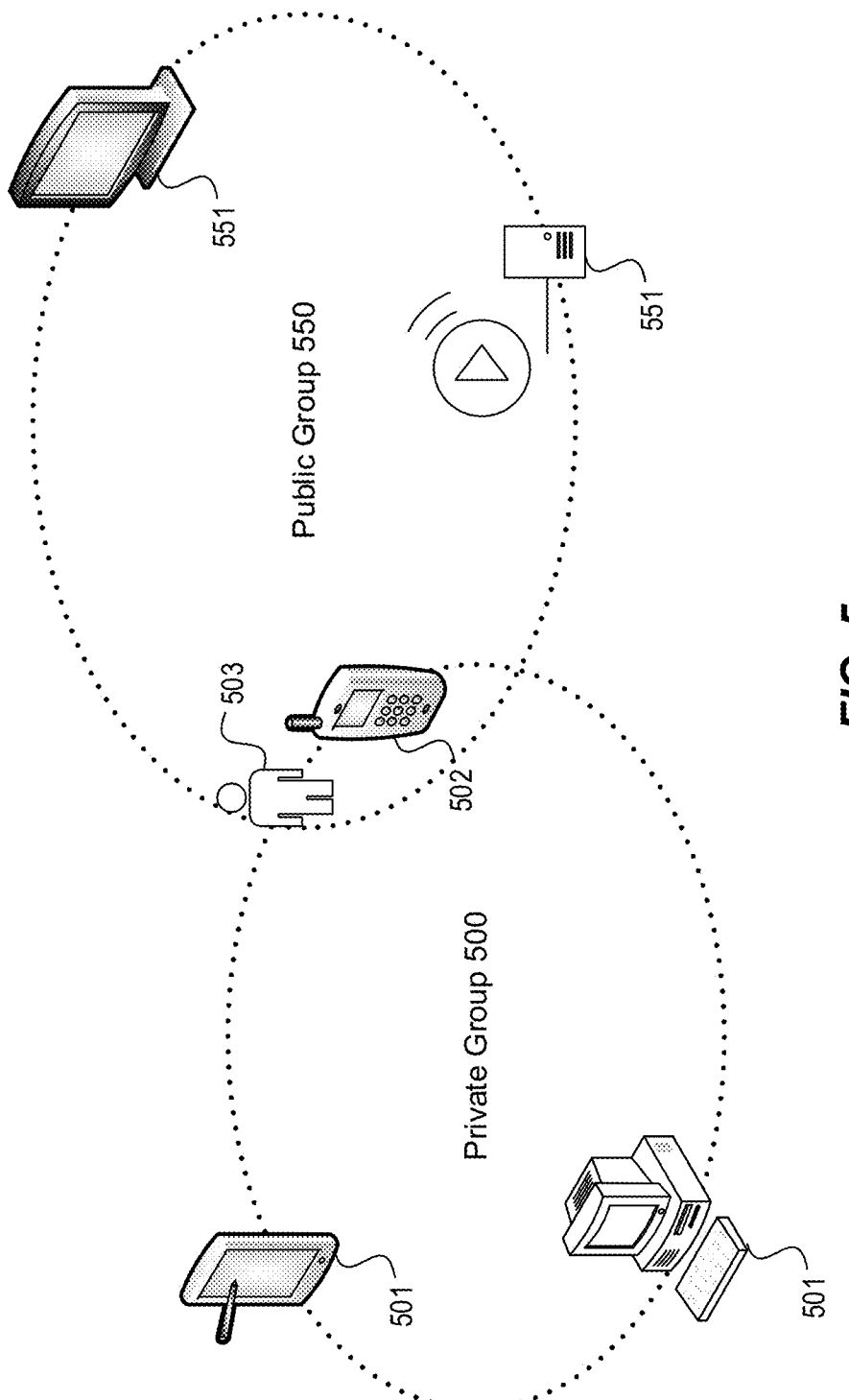
FIG. 5 depicts an illustrative operating environment that may be used in accordance with one or more illustrative aspects described herein.

FIG. 5 depicts an illustrative network of devices including private and public groups of devices associated with a user 503. A private group 500 of devices associated with user 503 may include one or more user devices 501, 502. Such devices may include devices owned by the user 503 and/or devices on which the user 503 has a personal account, such as a user's phone 502, personal computer 501, or tablet 501. In some embodiments, one of the user devices 502 may be designated as a user device that may indicate a location of a user 503 (e.g., because the user usually carries the device 502). In some embodiments, the user 503 may also be associated with a public group 550 of devices based on a location of the user 503 and/or device 502. For example, when a user 503 and/or device 502 is nearby public devices 551, user 503 may be able to interface and/or interact with public devices 551 via a device in the private group 500, such as device 502. The public devices may include, for example, a shared television 551 and a shared audio server 551. In some embodiments, public devices may include devices on which the user has a shared account (e.g., an office television, or a friend's television set to a guest mode) and/or devices that allow a private user device 502 to connect (e.g., via a BLUETOOTH connection).

Figure 6A:
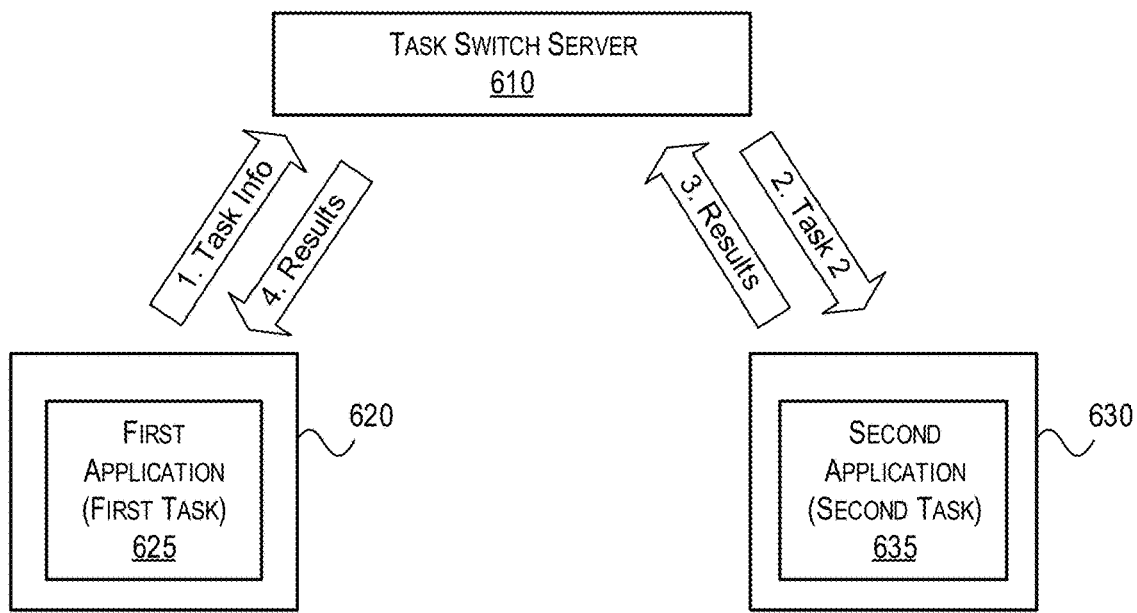
FIGS. 6A, 6B, 6C, and 6D depict illustrative system configurations that may be used in accordance with one or more illustrative aspects described herein.

FIG. 6A illustrates a first configuration for transferring a workflow task to a second device. A first device 620 may be executing a first application 625, and the first application 625 may be set to a state for performing a first task (e.g., a current task of a workflow). During user interaction with the first application 625, an event may cause the first application 625 to prepare to execute and/or begin executing a second task (e.g., a next task of the workflow). For example, a user interacting with the first device 620 and/or first application 625 may cause a selection of an option (e.g., via a user interface) to sign a document being viewed on the first device 620. The first device 620 may notify a task switch server 610 of task information (e.g., a current/first task and/or second/next task), and the task switch server 610 may detect an opportunity to perform a second task at a second device 630. The task switch server 610 may then instruct the second device 630 to perform the second task, including any additional data required to perform the task with the instruction (e.g., the document for signature). Responsive to the instruction, the second device 630 may cause a second application 635 executing on the second device 630 to perform the second task. The second application 635 may perform the second task, and further cause the second device 630 to transmit results of executing the second task back to the task switch server 610. For example, the second device 630 may transmit a signed document back to the task switch server 610. The task switch server 610 may then notify the first device 620 that the second device 630 has finished performing the task, and may include results associated with the task (e.g., the signed document). The first application 625 may then display and/or interact with the received results. In some embodiments, the second application 635 may be the same as the first application 625 (e.g., the first application 625 and second application 635 may both be an application with document viewing and signature functions).

Figure 6B:
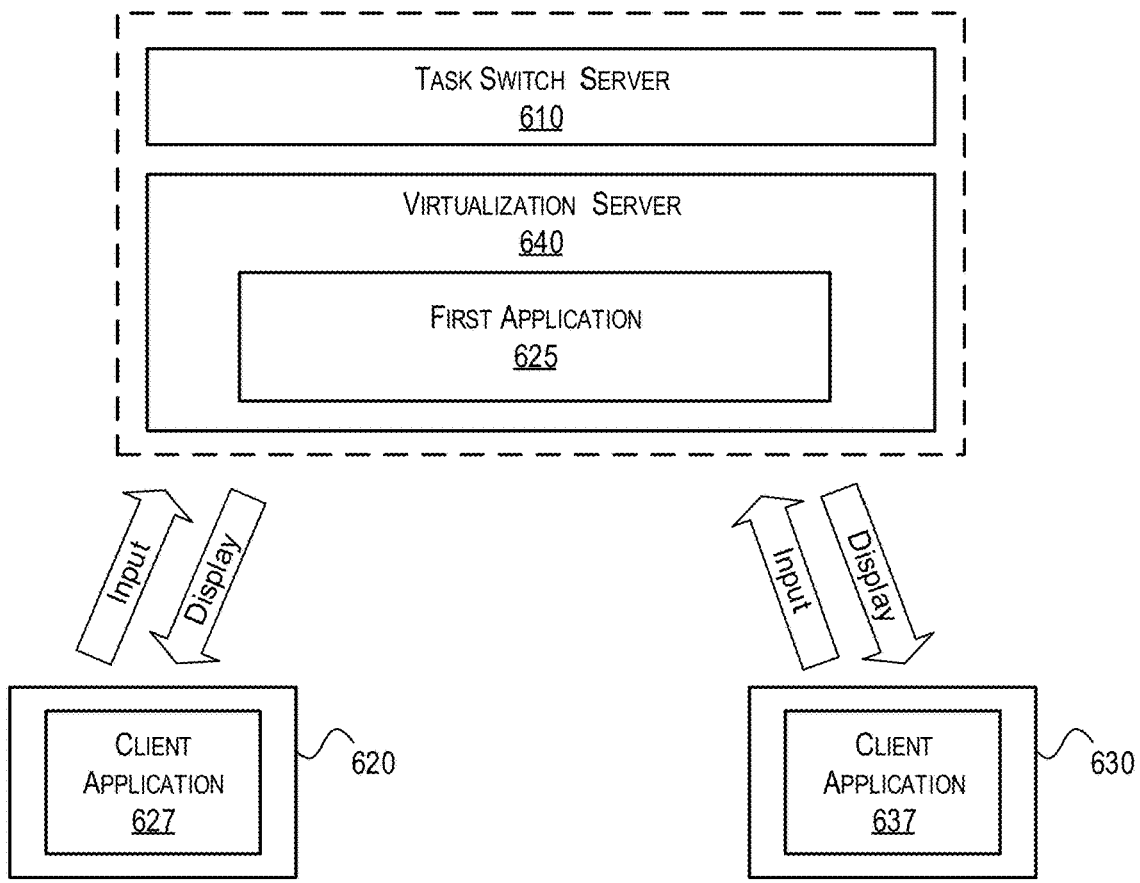

FIG. 6B illustrates a second configuration for transferring a task to a second device. According to the second configuration, a first application 625 may be a virtualized application running in a virtualization server 640. In some embodiments, the virtualization server 640 may be and/or include the application virtualization server 301 illustrated at FIG. 3. Devices 620 and/or 630 may locally run client applications 627, 637 for displaying and interacting with virtualized applications. In the second configuration, the task switch server 610 may be in operable communication with the virtualization server 640, and/or the task switch server 610 and virtualization server 640 may be part of a same server. Upon detection of a potential task switch event in a first virtualized application 625 being displayed on device 620, the task switch server 610 and/or the virtualization server 640 may transfer a network session for interacting with the first virtualized application 625 from the first device 620 to the second device 630. The first virtualized application 625 may then be displayed and interacted with via the second device 630 to perform a second task. After the second task is finished, the task switch server 610 and/or the virtualization server 640 may transfer the network session for interacting with the first virtualized application 625 back to the first device 620 from the second device 630.

Figure 6C:
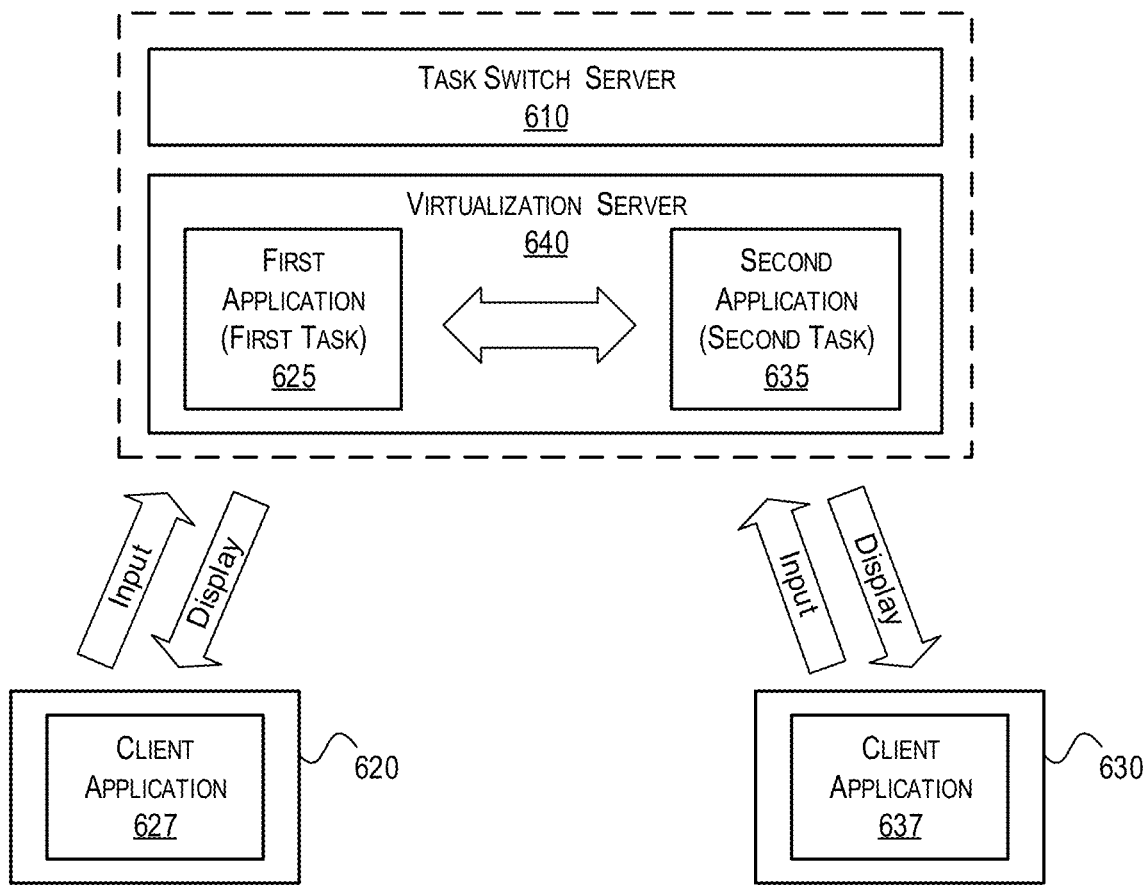

FIG. 6C illustrates a third configuration for transferring a task to a second device. According to the third configuration, the first application 625 and the second application 635 may be virtualized applications running in a virtualization server 640. In some embodiments, the virtualization server 640 may be and/or include the application virtualization server 301 illustrated at FIG. 3. Devices 620 and/or 630 may locally run a client application 637 for displaying and interacting with the virtualized applications. In the second configuration, the task switch server 610 may be in operable communication with the virtualization server 640, and/or the task switch server 610 and virtualization server 640 may be part of a same server. Upon detection of a potential task switch event in a first virtualized application 625 being displayed on device 620, the task switch server 610 may cause the virtualization server 640 to execute a second virtualized application 635 for performing a second task. The second virtualized application 635 may be displayed and interacted with via the second device 630. The virtualization server 640 may cause the first application 625 and second application 635 to communicate as necessary to transfer information and/or context (e.g., to transfer information associated with the second task and/or results of executing the second task back and forth). In some embodiments, the virtualization server 640 may reconfigure the first application 625 to yield the second application 635. After the second task is finished, the task switch server 610 and/or the virtualization server 640 may stop executing the second application 635 and/or close the network session with the second device 630.

Figure 6D:
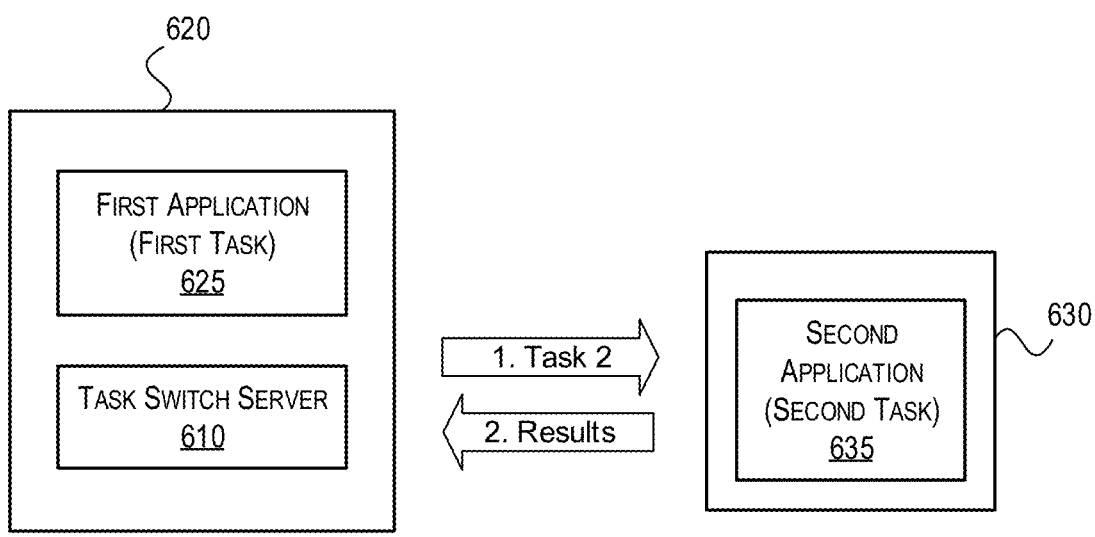
Figure 7C:
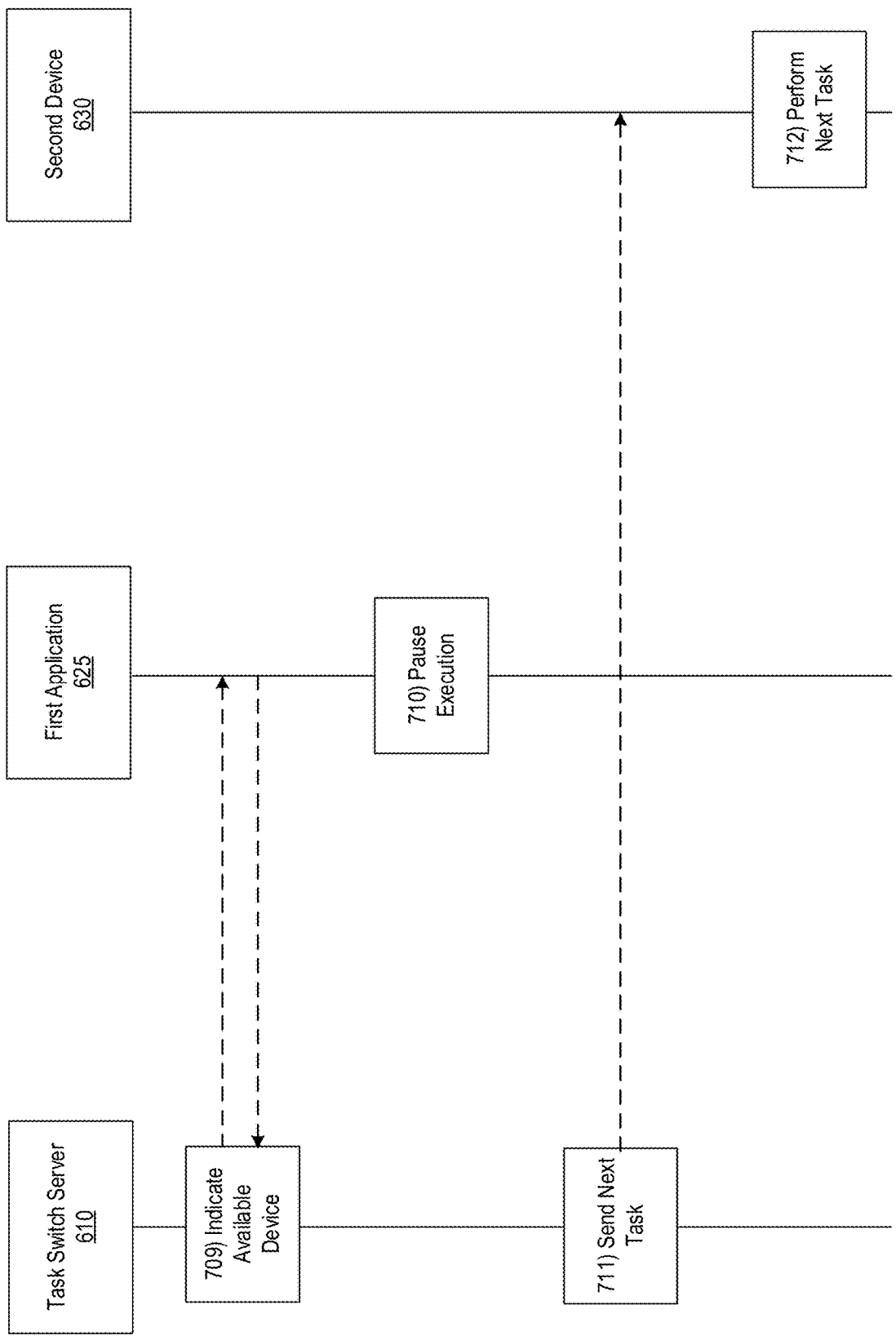

FIG. 6D illustrates a fourth configuration for transferring a task to a second device. According to the fourth configuration, the task switch server 610 may be a component of a first device 620. The task switch server 610 may optionally be a part of the first application 625, and/or the task switch server 610 may be implemented by a separate application. During user interaction with the first application 625, an event may cause the first application 625 to prepare to execute and/or begin executing a second task. The task switch server 610 of the first device 620 may receive (e.g., from the first application 625) task information (e.g., a current/first task and/or second/next task), and the task switch server 610 may detect an opportunity to perform a second task at a second device 630. The task switch server 610 may then cause the first device 620 to instruct the second device 630 to perform the second task, including any additional data required to perform the task with the instruction. Responsive to the instruction, the second device 630 may cause a second application 635 executing on the second device 630 to perform the second task. The second application 635 may perform the second task, and further cause the second device 630 to transmit results of executing the second task back to first device 620. The first application 625 may then display and/or interact with the received results. In some embodiments, the second application 635 may be the same as the first application 625 (e.g., the first application 625 and second application 635 may both be an application with document viewing and signature functions).

In some embodiments, the task switch server 610 may be, include, or be implemented by server 201 of FIG. 2.

FIGS. 7A, 7B, 7C, and 7D illustrate an example process diagram for transferring a task executed by a first application to another device. A first device 620 and second device 630 may respectively execute the first application 625 and a second application 635 according to a first configuration (e.g., according to the configuration illustrated by FIG. 6A). Alternatively, the first device 620 and second device 630 may respectively execute client applications 627, 637 for interacting with a virtualized first application 625 executing on a virtualization server 640 according to a second configuration (e.g., according to the configuration illustrated by FIG. 6B). Alternatively, the first device 620 and second device 630 may respectively execute client applications 627, 637 for interacting with a virtualized first application 625 and a virtualized second application 635 executing on a virtualization server 640 according to a third configuration (e.g., according to the configuration illustrated by FIG. 6C). Alternatively, the first device 620 may execute a first application 625 and a task switch server 610, and the second device 630 may execute a second application 635 according a fourth configuration (e.g., according to the configuration illustrated by FIG. 6D). Accordingly, functions described with reference to a task switch server 610 may be performed by a standalone task switch server 610 and/or the first device 620, functions described with reference to a first application 625 may be performed by a first device 620 and/or a virtualization server 640, and functions described with reference to a second device 630 may be performed by the second device 630 alone and/or by a virtualization server 640.

At step 701, task switch server 610 may receive, via a first application 625 executing on a first device 620 or a virtualization server 640, information indicating one or more device capabilities associated with a first device 620, which may be, for example, a device of private group 500 and/or public group 550. Device capabilities may include, for example, information about input capabilities (e.g., a type of input, such as a keyboard, mouse, touchscreen, camera, microphone, fingerprint reader, and the like, and any properties of the inputs, such as a resolution and/or shutter speed of a camera, a language of the keyboard, etc.), information about output devices (e.g., information about one or more display sizes, such as dimensions and/or resolutions of displays integrated or connected with the device 620, number and type of speakers, etc.), information about network interfaces (e.g., presence of a cellular interface and whether the device 620 has a cellular connection, presence of a BLUETOOTH interface and a list of connected devices, and the like), information about storage devices, (e.g., an amount of storage space on the device, an amount of free storage space on the device, and the like), and information about any other capabilities of device 620 (e.g., information about a graphics card and/or processor, information about whether the device is configured to perform iris recognition on captured images and/or videos, and the like).

In some embodiments, the first application 625 may collect information about the device capabilities and send the information to task switch server 610. For example, the first application 625 may be configured to gather such information (e.g., by recognizing functions made available by an operating system running on the device 620, accessing a list of device capabilities, and the like). In some embodiments, the first application 625 may obtain and send a device identifier (e.g., a unique device identifier and/or a type identifier such as a manufacturer, model, and/or version of the device) to task switch server 610, and task switch server 610 may retrieve a list of device capabilities associated with the indicated device identifier (e.g., from a database of such capabilities). For example, a communication from the first application 625 may include a user-agent string identifying a type of the device 620.

At step 702, task switch server 610 may generate and/or update a user profile include device capability information for at least device 620. The user profile may further include information about one or more other devices associated with a particular user, such as devices 501 and/or 502 of private group 500 and/or devices 551 of public group 550. The task switch server 610 may receive information about the capabilities of each device in the user profile at various times (not illustrated) as described for step 701.

The generated user profile may further include user preferences designating preferred devices, device rankings, and the like. In some embodiments, user preferences may be explicitly provided by a user 503 associated with the user profile. The task switch server 610 may provide a user interface (e.g., for display on device 620) allowing a user to explicitly select a user's favorite device(s) and/or rank the devices by preference. For example, the user may designate (e.g., via a user interface displayed on device 620) a favorite device ranking including a personal computer ranked first, followed by a tablet, followed by a mobile phone. In some embodiments, the user may designate one or more devices that indicate the user's location. For example, the user may designate that the location of a mobile phone and/or a smartwatch indicate the location of the user. The user profile may include such a designation. The task switch server 610 may receive indications from users including such preferences, and generate the user profile based on some or all of such preferences.

Users may also designate task-specific device rankings (e.g., via user interfaces provided by task switch server 610). For example, for a task of "watch video," a user may designate a ranking including a television ranked first, a tablet ranked second, and a mobile phone ranked third. As another example, for a task of "take a photo," a user may designate a ranking including a mobile phone ranked first, a tablet ranked second, and a laptop ranked third. The rankings may identify specific devices (e.g., a specific television, such as a living room television) and/or types of devices (e.g., any television in the user profile). The task switch server 610 may receive indications from users including such preferences, and generate the user profile based on some or all of such preferences.

In some embodiments, in addition to or as an alternative to explicit user preferences, task switch server 610 may collect information used to inferentially generate the user preferences. For example, task switch server 610 may receive information indicating frequency of usage of each device in the user profile. An application installed on each device (e.g., the first application 625 and/or client application 627 executing on device 620) may upload information indicating usage times, tasks performed on the device, locations, and/or location histories associated with the device. The task switch server 610 may determine a favorite device ranking based on usage of each device in the user profile (e.g., devices used more may be ranked higher). The task switch server 610 may further determine task-specific rankings based on a frequency and/or number of times a task is performed on each device in the user profile (e.g., devices that perform a task more may be ranked higher). The task switch server 610 may also determine which device in the user profile indicates a location of the user 503 based on a location history for each device (e.g., a device that moves most often and/or moves the most distance may indicate a user's location).

At step 703, task switch server 610 may track a user location by receiving location information of a device that indicates a user location. In the illustrated example, the first device 620 may be designated (e.g., by the user profile) as a device that indicate the user's location. Thus, by tracking the location of the first device 620, task switch server 610 may track a user location. The first application 625 may collect location information of the first device (e.g., by accessing a GPS function of the first device 620 and/or a list of devices detected via WI-FI and/or Bluetooth functions of the first device 620) and send the location information to the task switch server 610. Accordingly, the task switch server 610 may receive location information including GPS coordinates, latitude/longitude information, and the like. Additionally or alternatively, task switch server 610 may receive location information including one or more nearby wireless devices detected by first device 620 (e.g., WI-FI hotspots, BLUETOOTH devices, etc.).

At step 704, task switch server 610 may add devices to and/or remove devices from the user profile based on the location information (e.g., public devices 551 may be temporarily added and removed based on whether the user is nearby them). The task switch server 610 may maintain a list of devices (e.g., a database of public devices 551) and locations associated with each device. Based on comparing the location of the user to the locations of devices on the list, the task switch server 610 may determine that one or more devices are nearby the user. The task switch server 610 may determine that devices are nearby and add them to the list if the devices are within a certain distance of the user (e.g., a given radius) and/or if the user and the devices are on a same floor and/or a same room (e.g., using a premises map to determine if both the user and the device are within a defined area), or otherwise in a same area. In the illustrated example, task switch server 610 may determine that the user's location is nearby a location of a second device 630, and add the second device 630 to the user profile (e.g., if it was not already in the user profile).

If task switch server 610 does not already have information about the capabilities of second device 630, it may send a request to a second application 635 associated with a second device 630 for information about its device capabilities. Such information may be added to the user profile on a temporary basis. The task switch server 610 may additionally or alternatively determine device capability information for the user profile based on the location information received at step 703. For example, if the location information includes a list of detected wireless devices, information about the detected wireless devices may include type identifiers such as a vendor ID, a device ID, and the like. Therefore, task switch server 610 may determine device capabilities based on location information received at step 703.

The task switch server 610 may also remove devices from the user profile based on the user location. For example, when a tracked user location changes, task switch server 610 may determine whether devices in the user profile that were previously nearby the user are still nearby the user. If one or more devices are no longer nearby the user, those devices may be removed from user profile. In some embodiments, devices within a private group 500 may be kept in the user profile regardless of whether the user is nearby them or not, and devices in the public group 550 may be added to and removed from the user profile based on the tracked user location. In some embodiments, the user may designate one or more devices that will remain in the user profile regardless of a user location.

Referring to FIG. 7B, at step 705, the first application 625 may detect task information, which may include a current task and/or a next task, and transmit the task information to the task switch server 610. For example, first application 625 may be executing a first task. The first application 625 may then detect that the first application 625 is ready to perform a next task. In some embodiments, the first application 625 may determine that a next task has been selected by a user. For example, a user of a video streaming application may select video content and subsequently select a "play" button, which may correspond to a "display video" next task. Thus, the first application 625 may detect a next task in response to one or more user interactions with a user interface and/or user selections of a function.

As another example, an application may determine a (potential) next task based on the current task. For example, a document viewing application may display a document including a field for a user's signature. In this example, a current task of "view a document" (e.g., in combination with a document having a signature field) may cause the first application 625 to detect a next task of "sign a document." Thus, the first application 625 may detect a next task in response to performing a particular task as the current task. In some embodiments, a next task may be detected based on the current task only when one or more contextual signals is present (e.g., when a viewed document includes a signature field).

As another example, an application may determine a (potential) next task based on contextual signals such as time, location, a user's schedule, or some other contextual indicator of what a user may do next. For example, a calendar application may determine, based on an upcoming and/or current scheduled meeting containing a phone number, that a user may soon perform a "call phone number" task.

The first application 625 may detect a user's task information, including a current task and/or next task, using one or more variables describing a current state of the first application 625, a next state of the first application 625, received user interactions, and the like. The first application 625 may send such task information to the task switch server 610 at step 705. Thus, the first application 625 may be configured to interface with the task switch server 610 (e.g., using an API).

In some embodiments, the first application 625 may be a browser application enhanced with a browser plugin configured to detect a current state (e.g., the URL of a current page and/or one or more variables included in the URL and/or set by the browser) that indicates a current task. The browser plugin may additionally detect URLs associated with selected links (or links that a user may potentially select) that indicate a next task. The browser plugin may cause the browser application to send such task information (e.g., URLs for a current task and/or next task) to the task switch server 610 at step 705.

In some embodiments, the first application 625 may detect task information by maintaining application state information that is understandable to the task switch server 610. For example, the task switch server 610 may use and/or publish a task schema including a plurality of tasks, and the first application 625 may be configured to maintain state information indicating when one of the tasks of the task schema is a current task and/or a next task. For example, if task switch server 610 provides a task schema including a "display video" task, a video streaming application may track whether it is currently streaming a video, whether a user has selected to stream a video as a next task, and the like. The first application 625 may send such task information (e.g., information indicating a current task and/or next task in a format understandable by task switch server 610) to the task switch server 610 at step 705.

In some embodiments, the first application 625 may operate in conjunction with an operating system and/or virtualization layer (e.g., a hypervisor, virtual machine, and/or domain) running on the first device 620. The operating system and/or virtualization layer may be configured to detect a user's current task and/or next task by monitoring operating system and/or hardware functions requested by the first application 625. For example, if the first application 625 tries to access a camera (e.g., by sending a request using an API provided by the operating system and/or virtualization layer), the operating system and/or virtualization layer may determine that a "capture image" task is the next task. In some embodiments, the operating system and/or virtualization layer may provide "dummy" hardware and/or software features even when a device running the operating system and/or virtualization layer has no capability corresponding to the feature (e.g., the operating system may indicate a camera is installed even when a device running the operating system has no camera).

In some embodiments, the first application 625 may detect that the first device 620 lacks the capability to perform the requested task and/or a next task. For example, when the first application 625 attempts to access a function via a dummy device (e.g., such as a dummy camera), the operating system and/or virtualization layer may determine that the first device 620 lacks the capability to perform the requested function and provide such an indication to the first application 625. The task information transmitted to the task switch server 610 may include an indication of whether the device 620 has a capability of executing the next task.

The first application 625 may generate task information including an indication of the current and/or next tasks and/or one or more parameters associated with the current and/or next task. The one or more parameters may include information about data associated with the task (e.g., an address, such as a URL, for accessing the data, a type of data such as video, audio, or text, a format of data such as an encoding and/or compression format, and the like), and information about return data expected after performing the task (e.g., a format of a signed document for a "sign a document" task, a format of a transcoded video for a "transcode a video" task, and the like). The task information may additionally or alternatively include a data payload associated with the task (e.g., an image for viewing, a song for playback, a document needing a signature, and the like).

In some embodiments, the first application 625 may determine that the task is associated with private or sensitive data (e.g., personal data and the like). For example, the user may be viewing personal bank information on device 620. Accordingly, the first application 625 may include, in the task information, an indication that the task is a private task that should not be transferred to a public device. Additionally, data associated with the task information may, in some embodiments, be encrypted (e.g., using a secret key shared among the private devices 501, 502).

In some embodiments, the first application 625 may determine that the task is associated with user credentials. For example, if the first application 625 is a video streaming application, a user may be logged into an account of the first application 625. The first application 625 may include, in the task information, credentials information that may be used by a second device to log into the user account before executing the next task. The credentials information may be encrypted (e.g., using a secret key shared among the private devices 501, 502).

In some embodiments, the first application 625 may further include, in the task information, a data payload including data associated with the task. For example, the task information may include a photo for editing, a document to be signed, or other such data associated with the current and/or next task.

In some embodiments, first application 625 may be a containerized and/or virtual application, and first device 620 and/or virtualization server 640 may include, in the task information, an image of the containerized and/or virtual application 625, which may be transferred to another device for continued execution.

At step 706, task switch server 610 may receive the task information from the first application 625. In some embodiments, first application 625 may send task information for every detected current task and/or next task. In other embodiments, first application 625 may only send task information with approval from the user. For example, upon detecting a next task, the first application 625 may cause the first device 620 to display (e.g., via a popup notification) an indication that the user may request the next task to be performed at another device. For example, a notification may include text indicating a next task and indicating that another device may perform the next task (e.g., "Would you like to sign this document on another device?"). In some embodiments, the display may indicate that the first device 620 lacks the capability of performing the next task (e.g., "Your device has no camera. Would you like to capture the image on another device?"). In some embodiments, first application 625 may only send next task information to task switch server 610 when the first device 620 lacks the capability required to perform a task.

In some embodiments, task switch server 610 may receive information about a current task, and may determine information about a next task based on the information about the current task. The task switch server 610 may store workflow information indicating which next task(s) often or always follow a particular current task. For example, workflow information stored at task switch server 610 may indicate that when a current task includes "view a product," a next task usually includes "receive payment information." In some cases, the workflow information may be user-specific and/or device-specific. For example, a user-specific workflow may indicate that a user provides payment information via a particular cloud-based digital wallet. Accordingly, a next task may correspond to retrieving payment information from the particular digital wallet. Therefore, based on a current task, a user associated with the current task, and/or a device associated with the current task, the task switch server 610 may determine a next task.

At step 707, task switch server 610 may rank one or more devices in the user profile for performing the next task. The task switch server 610 may rank the devices in the user profile based on one or more factors. As one factor, the task switch server 610 may determine one or more devices of the user profile that have a capability associated with the task. As another factor, task switch server 610 may determine which devices are preferred based on a user device ranking and/or a task-specific device ranking included in the user profile. As another factor, task switch server 610 may determine which devices are closest to a user. As another factor, task switch server 610 may maintain one or more capability rankings associated with a task. For example, for a task associated with viewing images or videos, the task switch server 610 may determine and/or store a capability rank of devices based on display size. Similarly, for a task associated with playing audio, the task switch server 610 may determine and/or store a capability rank of devices based on a measure of sound system quality (e.g., a number of speakers, a size of speakers, a sound quality rating, and/or the like). The task switch server 610 may rank the devices based on one or more of these and other factors.

In some embodiments, task switch server 610 may exclude from the best device ranking any devices that do not have a capability associated with the task. For example, for a task of "capture an image," task switch server 610 may exclude any device that does not have a camera. Additionally or alternatively, task switch server 610 may exclude from the best device ranking any devices that are not nearby a user (e.g., within a threshold distance, on a same building floor, and/or the like). Additionally or alternatively, task switch server 610 may exclude devices in a public group 550 when the task involves private or sensitive data (e.g., user credentials, personal data, and the like). The task switch server 610 may also exclude from the best device rankings any devices that are ranked lower than the first device 620 (e.g., so that the task will not be transferred to a device with a worse ranking than first device 620).

As an example, task switch server 610 may receive a request to perform a "capture an image" task. The task switch server 610 may determine that a user profile includes a mobile phone, two tablets, and a laptop with a camera function. The task switch server 610 may further determine that a user preference ranking for a "capture an image" task lists a tablet in first position, a mobile phone in second position, and a laptop in third position. The task switch server 610 may further determine that both tablets are within a threshold distance of the user, and one of the tablets is closer. Based on these factors, the task switch server 610 may select the closer tablet as the best device. In other examples, the task switch server 610 may have selected the mobile phone as the best device (e.g., if neither of the tablets were nearby the user), the laptop as the best device (e.g., if the task-specific user preference ranking listed the laptop higher than the mobile phone), or some or other device based on one or more of the three factors.

As a second example, task switch server 610 may receive a request to perform a "video playback" task. The task switch server 610 may determine that a user profile includes six devices with displays that are capable of displaying the movie. The task switch server 610 may further determine that a user preference ranking for a "video playback" task lists a television in first place, a tablet in second place, and a mobile phone in third place. The task switch server 610 may further determine that a capability ranking indicates a television in first place, a desktop computer in second place, a laptop in third place, a tablet in fourth place, and a mobile phone in last place. The task switch server 610 may further determine that a tablet, a laptop, and a mobile phone are nearby the user. Based on these and/or other factors, task switch server 610 may select one or more of the devices. For example, task switch server 610 may select the tablet due to its higher position on the user preference ranking, which may outweigh the laptop's higher position on the device capability ranking.

At step 708, task switch server 610 may determine a highest-ranked device's availability for performing the requested task. The task switch server 610 may send a request that may be received by the highest-ranked device, which may respond to the task switch server 610 with an indication of the highest-ranked device's availability. The highest-ranked device may determine its availability based on determining a currently logged-in and or active user (e.g., if a user different from the user of the first device 620 is logged in and/or interacting with one or more applications running on the highest-ranked device, the highest-ranked device may determine that it is not available), based on detecting inactivity (e.g., if no user interactions have been received for at least a threshold time, the highest-ranked device may determine that it is available).

If the highest-ranked device indicates that it is not available, and/or if the task switch server 610 receives no response from the highest-ranked device, the task switch server 610 may repeat step 708 for a second-ranked device in the best devices ranking. The task switch server 610 may repeat step 708 until it finds an available device that is ranked higher than the first device 620.

At step 709, task switch server 610 may send a notification to the first application 625 indicating that another device is available to perform the requested task. In some embodiments, responsive to receiving the notification, the first application 625 may cause the first device 620 to display an option to accept and/or decline the task switch (e.g., as a pop-up notification). The option may indicate an identity of the second device and an identity of the task (e.g., "Would you like to sign this document on your mobile phone?" or "Would you like to view this movie on the television?"). If the user accepts the task switch, the first application 625 may send an indication of the acceptance to task switch server 610.

At step 710, the first application 625 may pause execution while waiting for the second device 630 to finish interacting with and/or performing the task. In some embodiments, the first application 625 may cause the first device 620 to display an overlay indicating that the task may be performed on the second device 630. At the same time, the first application 625 may display a blank screen and/or disable responses to user inputs (e.g., ignore user touchscreen inputs, keyboard inputs, and/or the like), so that a user stops interacting with the first application 625.

At step 711, responsive to the indication from first application 625, the task switch server 610 may send an instruction that causes performance of the next task at a second device 630 (e.g., by a second application 635 executing on the second device and/or by a virtualized application connected to a client application 627 executing on second device 630). The instruction may include one or more parameters indicating the task, one or more applications that may perform the task, references to data related to the task (e.g., a URL of a video to be displayed), and/or information about the data related to the task (e.g., one or more formats of the data). Additionally or alternatively, the instruction may include (or be attached to) a data payload comprising the data related to the task (e.g., a document for signature, a song for playback).

At step 712, the second device 630 may begin performing the second task (e.g., by a second application 635 executing on the second device and/or by a virtualized application connected to a client application 637 executing on second device 630). In some embodiments, the second device 630 and/or virtualization server 640 may initially launch a second application 635 if a second application 635 is not already running. The second application 635 may then access a particular state indicated by the next task instruction. For example, task switch server 610 may send an instruction in a format that is compatible with an operating system of the second device 630 (and/or the virtualization server 640) and the second application 635 for performing the task. The second application 635, upon receiving the instruction, may begin performing the task.

As another example, task switch server 610 may send an instruction configured to cause a virtualization layer executing on the second device 630 to launch a virtualized application and/or set the virtualized application into the same state as the first application 625 executing on the first device 620. Additionally or alternatively, task switch server 610 may include, in the instruction, an image of a virtual or containerized application for execution on the second device 630. The second device 630 may then execute the virtual and/or containerized application to perform the second task.

In some embodiments, the instruction may cause a client application 637 executing on the second device 630 to establish a network connection with the virtualization server 640. The second device 630 may then perform the second task in conjunction with a virtualized application (e.g., a virtualized first application 625 or virtualized second application 635) executing on the virtualization server 640.

If the instruction included encrypted data and/or credentials, the second device 630 (and/or virtualization server 640) may cause decryption of the data and/or credentials, (e.g., using a shared secret key). The second device 630 (and/or virtualization server 640) may then access the data and/or use the credentials to access an account associated with the user before performing the task. Accordingly, the task switch server 610 may be able to transfer a task associated with private data and/or a user login in a secure manner.

During or after performing the next task at step 712, the second device 630 (and/or virtualization server 640) may generate return data. For example, for a task of "sign a document," performing the task may result in a signed document. As another example, for a task of "edit and image" or "capture an image," the task may result in an edited and/or captured image.

Referring to FIG. 7D, at step 713, the return data may be sent to the task switch server 610. The second device 630 (and/or virtualization server 640) may further include, as part of the return data, current and/or next task information (e.g., for the second task and/or a third task) describing a current and/or next state of the application that performed the second task, as described for steps 705-706.

At step 714, task switch server 610 may send the return data to the first application 625. The task switch server 610 may further include an instruction to configure the first application 625 to resume execution from a particular state corresponding to the second task and/or a third task that follows the second task.

At step 715, the first application 625 may resume execution (e.g., remove an overlay and begin accepting user input again). Responsive to the instruction from task switch server 610, the first device 620 may set the first application 625 into a new state for displaying any return data and/or for performing a third task.

After performing step 715, the task switch server 610 and/or the first application 625 may repeat any other steps. For example, the first application 625 may continue to send a user location as described for step 703 and/or determine a current and/or next task information as described for step 705. The task switch server 610 may continue to monitor a user location, add/remove devices from the user profile, and receive task information as described at steps 703-706. Responsive to receiving task information, task switch server 610 may cause any or all of steps 707-715 to be executed again.

In some embodiments, a third task specified in the return data of step 714 may be transferred to a third device different from the first device 620 and second device 630, based on a best-device ranking associated with the third task. The third task may then be transferred to the third device, as described above in relation to transferring the second task to the second device.

Figure 8:
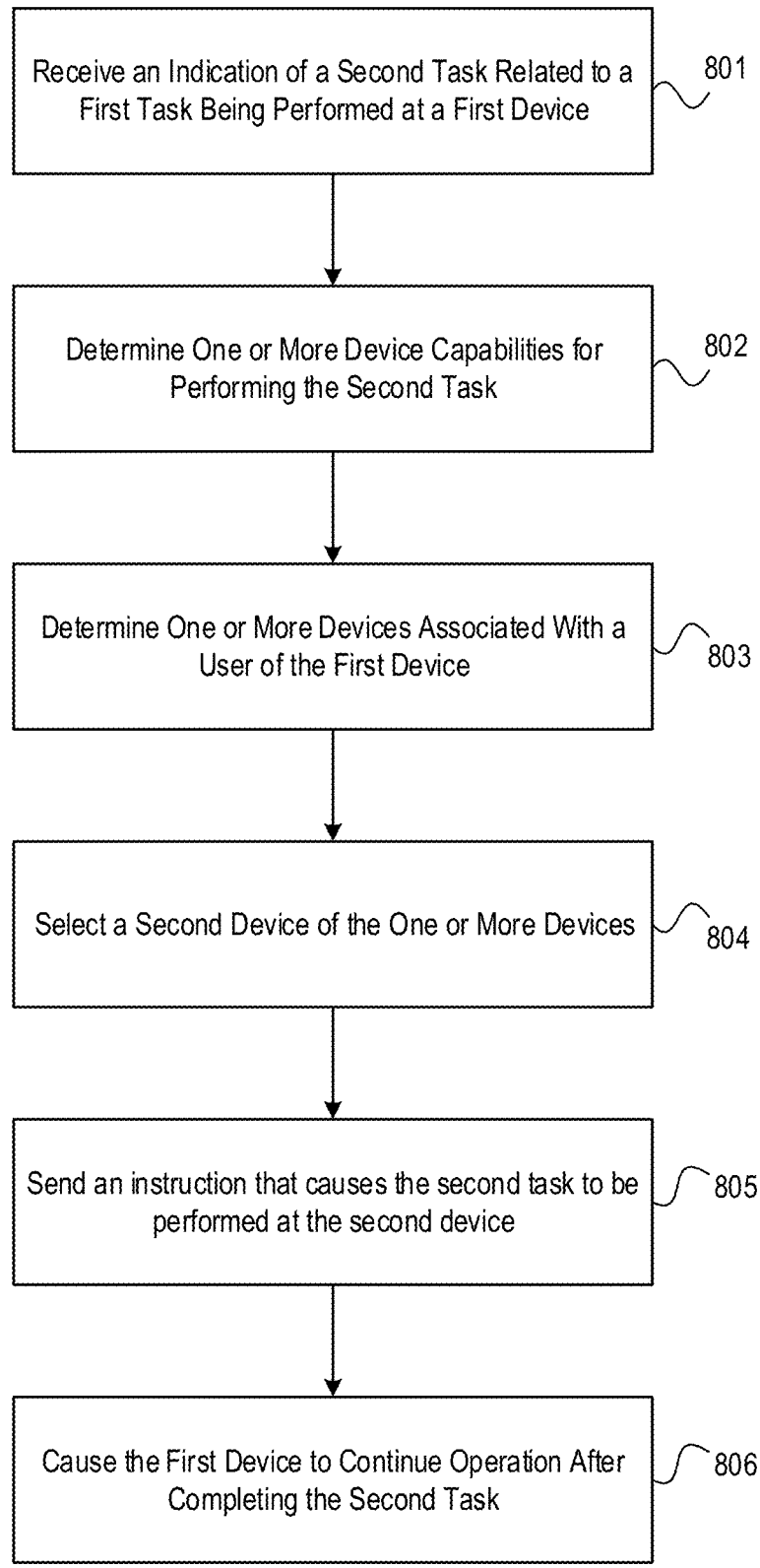
FIG. 8 depicts an illustrative method that may be used in accordance with one or more illustrative aspects described herein.

FIG. 8 illustrates a method that may be performed by a task switch server 610. At step 801, the task switch server 610 may receive an indication of a second task related to a first task being performed via a first device (e.g., the first task may be executed at the first device and/or executed by a virtualization server accessed via the first device). The second task may be a task that the first device is ready to perform (e.g., because a user of the first devices selected the second task and/or the first device will likely perform the second task after completing the first task). Accordingly, the second task may be determined based on the first task and/or one or more contextual signals indicating what task will be the next task in a user workflow.

At step 802, the task switch server 610 may determine one or more device capabilities associated with the second task. The device capabilities may include required and/or preferred device hardware and/or software capabilities. The task switch server 610 may store one or more device capabilities associated with each of a plurality of tasks.

At step 803, the task switch server 610 may determine one or more devices associated with a user of the first device. The one or more devices may be devices owned by, used by, nearby, and/or otherwise associated with the user. Such devices may appear within a user profile maintained by the task switch server 610.

At step 804, the task switch server 610 may select a second device from among the one or more devices associated with the user. The second device may be the best device for performing the second task. The task switch server 610 may rank the one or more devices and determine a best device based on the ranking. The task switch server 610 may verify that the best device is available to perform the second task.

At step 805, the task switch server 610 send an instruction that causes performance of the second task via the second device (e.g., the second task may be executed at the second device and/or executed by a virtualization server accessed via the second device). The instruction may include data and/or a reference to data associated with the second task. The instruction may cause the second device (and/or a virtualization server) to access the data, perform the second task, then transmit any data affected by the performance of the second task back to the task switch server 610. At step 806, the task switch server 610 may cause the first device to receive and/or display any data resulting from the performance of the second task, and/or otherwise continue operation after performing the second task.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
   receiving an indication that an application on a first device is ready to perform a task, wherein the task being one of a series of tasks of a workflow;
   determining a preferred device capability for performance of the task;
   after determining that the first device lacks the preferred device capability, selecting a second device, from a plurality of devices associated with a user of the first device, that has the preferred device capability;
   after selecting the second device, transferring the task from the application on the first device to a same application on the second device in order to continue the workflow on the second device, wherein the transferring comprises:
      pausing execution of the application on the first device; and
      sending data to the second device to enable the same application on the second device to perform the task as the application on the first device remains paused; and
   responsive to completion of the task by the second device, resuming the workflow on the first device by resumption of execution of the paused application on the first device to perform a next task of the series of tasks of the workflow using results of the task performed on the second device.

2. The method of claim 1, wherein the task is further associated with one or more of a display size, a type of output device, and a type of network connection.

3. The method of claim 1, further comprising:
   receiving, from the second device, one or more device capabilities associated with the second device; and
   adding the second device and the one or more device capabilities to a profile associated with the user.

4. The method of claim 3, further comprising:
   determining a current time of day;
   determining that the user is nearby the second device based on historical data indicating where the first device associated with the user is normally located during the current time of day; and
   before receiving the one or more device capabilities from the second device, and responsive to determining that the user is nearby the second device, transmitting, to the second device, a request for the one or more device capabilities associated with the second device.

5. The method of claim 1, wherein the device capability comprises hardware for authorizing a user identity.

6. The method of claim 1, wherein the determining of the preferred device capability comprises generating a ranking of a plurality of device capabilities, wherein the preferred device capability is the highest ranked of the plurality of device capabilities, wherein a device capability of the first device is ranked below the preferred device capability.

7. The method of claim 1, further comprising, during the pausing of the execution of the application running on the first device, displaying a message on the first device indicating that the second device is performing the task.

8. The method of claim 1, wherein the indication that the application running on the first device is ready to perform the task comprises an indication that the application attempted to access a virtual device associated with the preferred device capability.

9. The method of claim 1, wherein the application running on the first device is a web browser, and the indication that the application running on the first device is ready to perform a task comprises an indication that the web browser received a selection of a link.

10. A system comprising:
    a first device;
    a second device; and
    a third device comprising one or more processors, a communication interface, and one or more non-transitory computer readable media storing instructions that, when executed by the one or more processors, cause the third device to:
       receive, via the communication interface, an indication that an application running on the first device is ready to perform a task under control of a user of the first device, wherein the task being one of a series of tasks of a workflow;
       determine, by the one or more processors, a device capability associated with performing the task;

determine, by the one or more processors, one or more devices associated with a user of the first device, wherein each of the one or more devices has the device capability;

select, by the one or more processors, based on the task and one or more user preferences associated with the user, the second device from the one or more devices; and send, via the communication interface, an instruction to the second device, wherein the instruction causes the second device to perform the task;

send, via the communication interface, an instruction, to the first device, that causes the first device to pause an execution of the application on the first device while the second device continues the workflow by performing the task; and responsive to completion of the task by the second device, send, via the communication interface, an instruction that causes the first device to resume the workflow by resumption of execution of the paused application on the first device to perform a next task of the series of tasks of the workflow.

11. The system of claim 10, wherein the device capability is one or more of a display size, a type of input device, a type of output device, and a type of network connection.

12. The system of claim 10, wherein the one or more non-transitory computer readable media further store instructions that, when executed by the one or more processors, cause the third device to:

receive, via the communication interface, from the second device, one or more device capabilities associated with the second device; and add, by the one or more processors, the second device and the one or more device capabilities to a profile associated with the user.

13. The system of claim 12, wherein the one or more non-transitory computer readable media further store instructions that, when executed by the one or more processors, cause the third device to:

determine a current time of day;

determine that the user is nearby the second device based on historical data indicating where the first device associated with the user is normally located during the current time of day; and before receiving the one or more device capabilities from the second device, and responsive to determining that the user is nearby the second device, transmit, via the communication interface, to the second device, a request for the one or more device capabilities associated with the second device.

14. The system of claim 10, wherein the instruction further causes the first device to, during the pausing, display a message indicating that the second device is performing the task.

15. The system of claim 10, wherein the indication that the application running on the first device is ready to perform a task comprises an indication that the application attempted to access a virtual device associated with the device capability.

16. The system of claim 10, wherein the application running on the first device is a web browser, and the indication that the application running on the first device is ready to perform a task comprises an indication that the web browser received a selection of a link.

17. An apparatus comprising:
one or more non-transitory computer readable media storing instructions that, when executed by one or more processors, cause the apparatus to:

receive an indication that an application on a first device is ready to perform a task, wherein the task being part of a series of tasks of a workflow;

determine, by the one or more processors, a device capability associated with performing the task;

determine, by the one or more processors, one or more devices associated with a user of the first device, wherein each of the one or more devices has the device capability;

select, by the one or more processors, based on the task and one or more user preferences associated with the user, a second device from the one or more devices;

send an instruction to the second device, wherein the instruction causes the second device to perform the task;

send an instruction, to the first device, that causes the first device to pause an execution of the application on the first device while the second device continues the workflow by performing the task; and responsive to completion of the task by the second device, send an instruction that causes the first device to resume the workflow by resumption of execution of the paused application on the first device to perform a next task of the series of tasks of the workflow.

18. The apparatus of claim 17, wherein the instruction further causes the first device to, during the pausing, display a message indicating that the second device is performing the task.

19. The apparatus of claim 17, wherein the indication that the application associated with a first device is ready to perform the task comprises an indication that the application attempted to access a virtual device associated with the device capability.

20. The apparatus of claim 17, wherein the application is a web browser, and the indication that the application running on the first device is ready to perform a task comprises an indication that the web browser received a selection of a link.

* * * * *